United States Patent [19]

Honjo et al.

[11] Patent Number: 4,844,034
[45] Date of Patent: Jul. 4, 1989

[54] IGNITION TIMING CONTROL APPARATUS

[75] Inventors: Yoshihisa Honjo; Hiroshi Okuda, both of Himeji, Japan

[73] Assignee: Mitsubishi Denki Kabushiki Kaisha, Tokyo, Japan

[21] Appl. No.: 190,096

[22] Filed: May 4, 1988

[30] Foreign Application Priority Data

May 9, 1987 [JP] Japan .................. 62-112770

[51] Int. Cl.$^4$ ................................ F02P 5/15
[52] U.S. Cl. .................... 123/424; 123/413; 123/602; 123/418
[58] Field of Search ............... 123/413, 414, 418, 424, 123/602, 604, 618

[56] References Cited

U.S. PATENT DOCUMENTS

| 3,855,985 | 12/1974 | Shirai ................... 123/602 |
| 4,612,899 | 9/1986 | Honjoh et al. ......... 123/413 |
| 4,679,540 | 7/1987 | Abe et al. ............. 123/602 |
| 4,790,280 | 12/1988 | Umehara et al. ..... 123/424 X |

FOREIGN PATENT DOCUMENTS

| 0092354 | 7/1981 | Japan . |
| 0028594 | 2/1983 | Japan .................. 123/413 |
| 0023071 | 2/1984 | Japan .................. 123/602 |
| 0037268 | 2/1984 | Japan .................. 123/602 |
| 0046370 | 3/1984 | Japan .................. 123/413 |
| 0162068 | 8/1985 | Japan . |

Primary Examiner—Willis R. Wolfe
Attorney, Agent, or Firm—Lowe, Price, LeBlanc, Becker & Shur

[57] ABSTRACT

In start of an engine, an ignition signal having a constant advance angle with respect to a top dead center of the engine is generated, and in idling state after a predetermined time period of start of the engine, the ignition signal is intercepted by a first masking circuit, and then number of pulses which are issued for predetermined revolution angles of the engine is counted; and ignition signals which are retarded from the above-mentioned ignition signal are output for a predetermined numbers of the pulses; furthermore in a predetermined range of opening degrees of the throttle valve, the ignition timing of the ignition signal is advanced responding to the opening degree of the throttle valve, and in a range over the predetermined opening degree of the throttle valve, the advance angle of the ignition timing is held at a constant value.

6 Claims, 6 Drawing Sheets

IGNITION TIMING CONTROL APPARATUS

FIELD OF THE INVENTION AND RELATED ART STATEMENT

1. Field of the Invention

The present invention relates generally to an ignition timing control apparatus, and more particularly to an ignition timing control apparatus having a function which is applicable to an internal combustion engine, such as out-board engine.

2. Description of the Related Art

In an out-board engine, an ignition timing advancing apparatus or the like which is in operative connection with a throttle valve is provided in order to make easy start of the out-board engine, and to reduce and stabilize a revolution speed in idling and realize quick response in operation of the throttle valve. In the ignition timing advancing apparatus, ignition timing is generally selected at about 5° before top dead center (hereinafter is referred to as BTDC) for start, at about 5° after top dead center (hereinafter is referred to as ATDC) in idling and at about 20° BTDC in fully opened state of the throttle valve. In order to obtain the sabove-mentioned characteristic, such a method of sifting an ignition signal generating apparatus of the engine has been generally used in the prior art that timing of the ignition signal is to be shifted from an initial position by mechanical means composed of a cam-structure and a link-structure which are arranged on a throttle lever.

In the prior art, since the out-board engine vibrates severely in operation, the ignition signal generating apparatus is liable to be worn or broken by the vibration, and it is difficult to retain high reliability.

On the other hand, a method of advancing ignition timing by operation of an electronic circuit which is in operative connection with the throttle valve is disclosed in the Japanese published unexamined patent application No. Sho 56-92354. In the prior art No. Sho 56-92354, a reference signal is generated by a reference signal generating means at a predetermined revolution position of a crank of the engine. An opening degree of the throttle valve is detected by an opening degree signal generating means. Then, an ignition timing operation means which receives and is controlled by an opening degree signal issued from the opening degree signal generator generates an ignition signal at a delayed timing from the reference signal, which is corresponding to the opening degree of the throttle valve.

On the other hand, a method of obtaining a similar characteristic of the above-mentioned mechanical method using a throttle switch and a timer is disclosed in the Japanese published unexamined patent application No. Sho 60-162068. In the prior art No. Sho 60-162068, though the defect of the above-mentioned mechanical means can be overcome, the ignition timing control apparatus advances the ignition timing by a full angular advance at a fully open state of the throttle valve; and in a middle opened state thereof, the ignition timing is advanced based by increase of a rotation speed of the engine. Therefore, it is inferior in response characteristic.

OBJECT AND SUMMARY OF THE INVENTION

An object of the present invention is to provide an ignition timing control apparatus which is resistant to vibration and has ideal characteristics and high reliability.

The ignition timing control apparatus in accordance with the present invention comprises:

a revolution angle sensor for generating a first signal and a second signal which is retarded from the first signal and has optimum ignition timing for starting an engine, a throttle valve opening degree sensor which is in operative connection with a throttle valve of the engine and for generating a valve opening degree signal corresponding to an opening degree of the throttle valve, a function voltage generator for generating an output voltage on the basis of the signal of the throttle valve opening degree sensor, a crank angle sensor for generating a pulse signal corresponding to a revolution angle of the engine, a pulse counting circuit for counting the pulse signal and generating a third signal which is retarded at least from the second signal and is optimum for ignition in idling, an ignition timing control circuit for generating a control signal which is to be retarded from the third signal when the opening degree of the throttle valve is within a first predetermined degree, to be advanced as the opening degree increases in a manner to give an opening suitable for a high speed revolution when the opening degree is above the first opening degree and under a second opening degree of the throttle valve, switching means for giving ignition means an ignition pulse by being actuated by an earliest signal among the control signal from the ignition timing control circuit or the second signal and the third signal received thereby, a timer for detecting lapse of a predetermined time period after start of the engine to issue a time lapse signal, and a masking circuit for intercepting the second signal to be applied to the switching means at reception of the time lapse signal issued by the timer.

DESCRIPTION OF THE PREFERRED EMBODIMENTS

Figure 1:
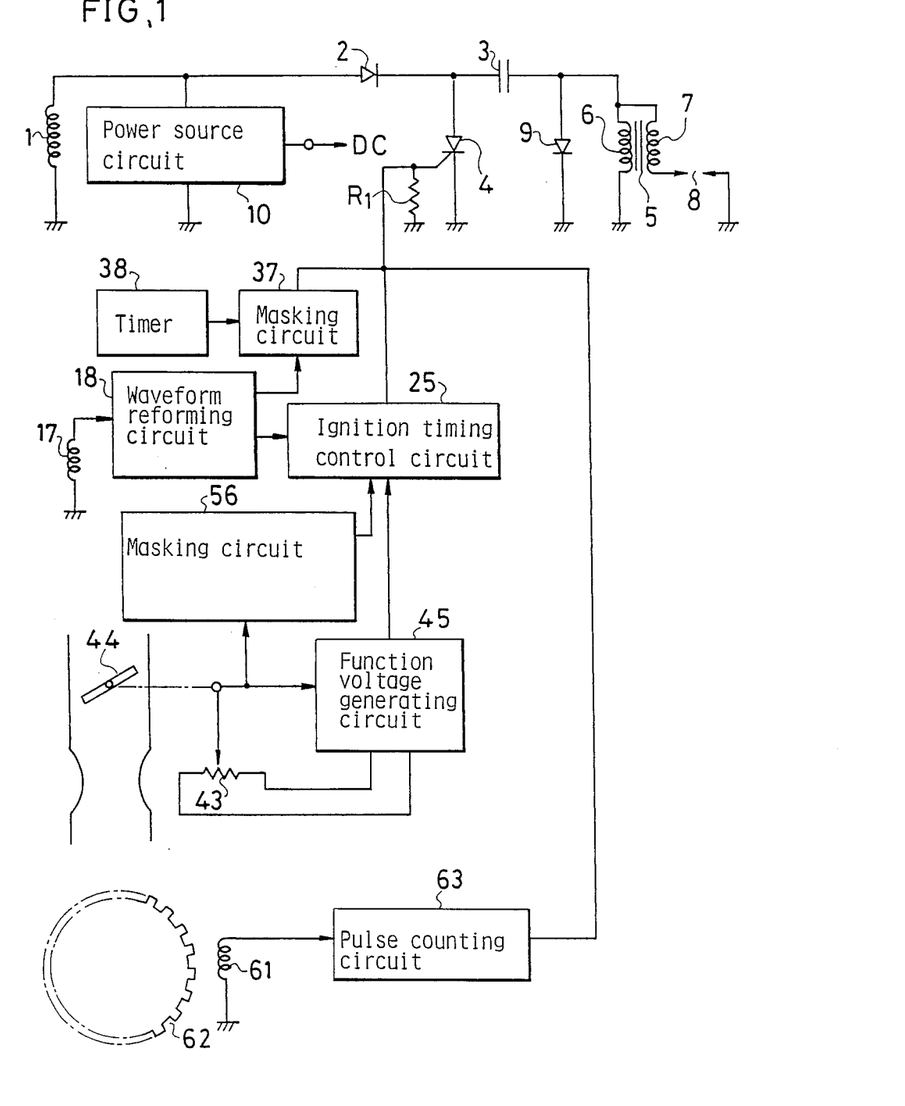
FIG. 1 is a block diagram of a first embodiment of an ignition timing control apparatus in accordance with the present invention.

FIG. 1 is a block diagram of a first embodiment of the present invention. Referring to FIG. 1, winding 1 of a power source, such as a magneto generator winding, is to generate an electric power for ignition and is mounted in a generator of an engine.

One terminal of the power source winding 1 is grounded, and the other terminal is coupled to a power source circuit 10 and the anode of a diode 2. The cathode of the diode 2 is coupled to a common terminal of the primary winding 6 and the secondary winding 7 of a ignition coil 5 through a capacitor 3. A fly-wheel diode 9 is coupled across the primary winding 6 of a transformer 5 in forward direction. The other terminal of the secondary winding 7 is coupled to an ignition plug 8.

The alternating current given by the power source winding 1 is rectified by the diode 2, and the capacitor 3 is charged by the rectified current. The fly-wheel diode 9 serves to prevent recharge of the capacitor 3 by a counter electromotive force of the ignition coil 5. A thyristor 4 as a switching device is coupled to a junction of the cathode of the diode 2 and the capacitor 3 by the anode and is coupled to a ground by the cathode. Outputs of an ignition timing control circuit 25, a masking circuit 37 and a pulse counting circuit 63 are applied to the gate of the thyristor 4. A resistor $R_1$ is coupled across the gate and cathode of the thyristor 4. Thus, the thyristor 4 is controlled by the earliest signal from the ignition timing control circuit 25, the masking circuit 37 and the pulse counting circuit 63, and make the electric charge of the capacitor 3 discharge through the primary winding 6 of the ignition coil 5; and a high voltage current is induced in the secondary winding 7. The high voltage current of the secondary winding 7 is supplied to the ignition plug 8. The above-described part of the circuit shows an ignition apparatus of a conventional capacitor discharge type.

Figure 2:
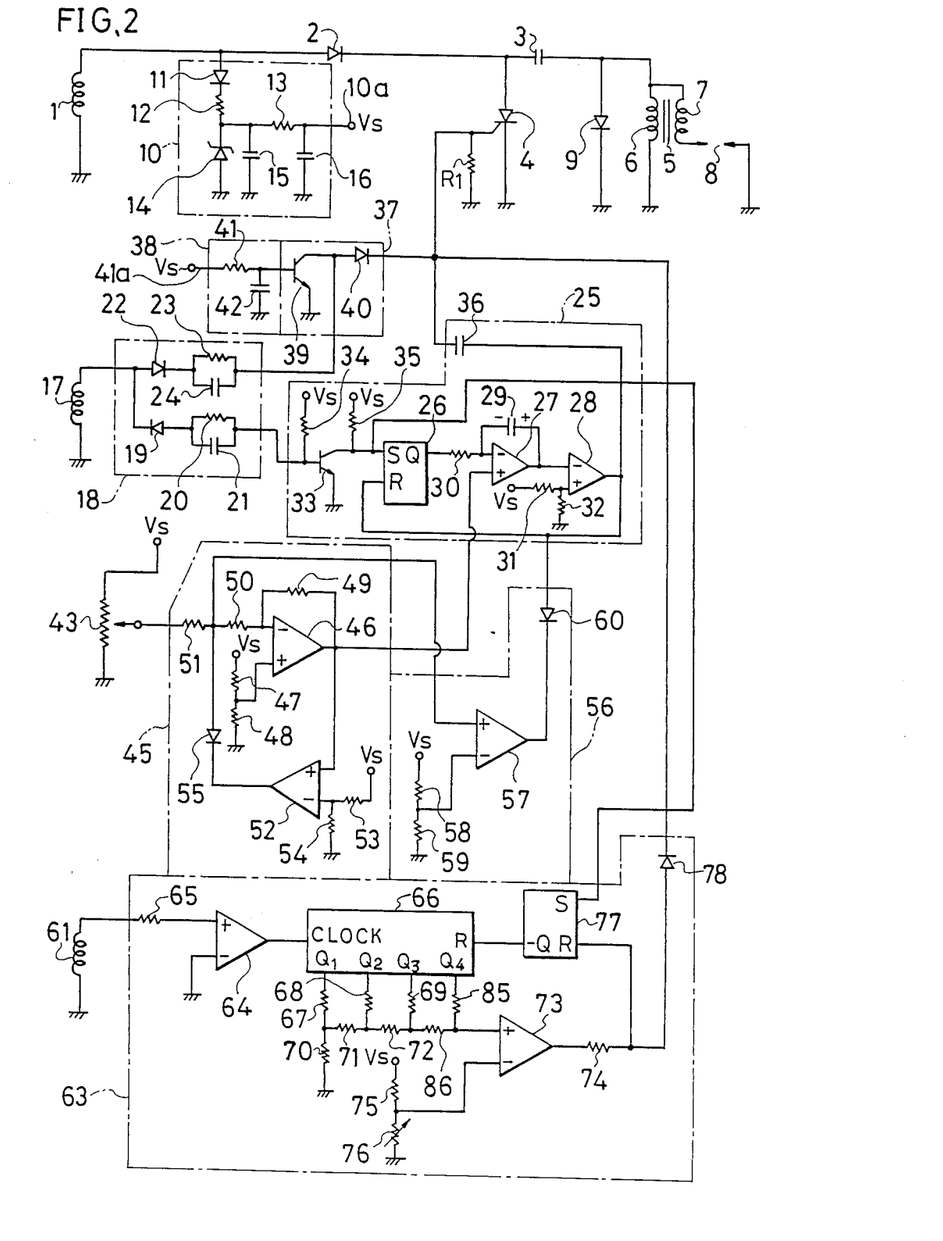
FIG. 2 is a circuitry of the embodiment as shown in FIG. 1.

The power source circuit 10 coupled to the power source winding 1 issues a regulated DC voltage as a power source for all the circuits of the ignition timing control circuit of the embodiment. The power source circuit 10 is composed, as shown in FIG. 2, of a series circuit of a diode 11 and a Zener diode 14 and a filter circuit, which comprises a capacitor 15 and 16 and a resistor 13 and is connected across the Zener diode 14. The constant voltage Vs of the power source circuit 10 is issued from a terminal 10a.

Figure 3:
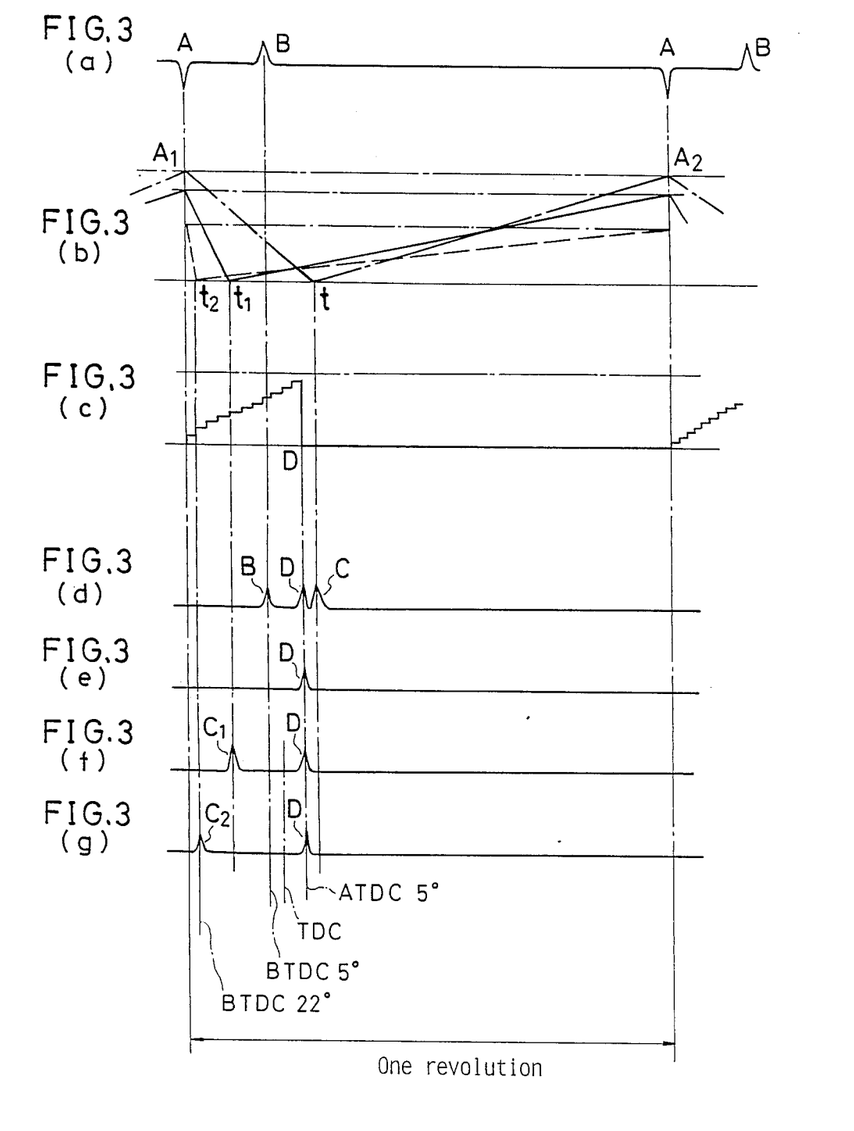
FIG. 3(a), FIG. 3(b), FIG. 3(c), FIG. 3(d), FIG. 3(e), FIG. 3(f) and FIG. 3(g) are waveforms showing operation of the embodiment.

A pickup coil 17 is provided in a revolution angle sensor of the engine, and generates an ignition timing signal by detection of a magnet mounted on a predetermined position of a rotating member of the engine. The pickup coil 17 generates one negative pulse signal A and one positive pulse signal B in one revolution of the engine as shown in FIG. 3(a). The output of the pickup coil 17 is inputted in a waveform reforming circuit 18. Both the pulse signals A and B are generated before top dead center (TDC), and the pulse signal A is first generated, and the pulse signal B is generated next. In the embodiment, the pulse signal A is used as a reference signal of ignition timing control in the steady state operation, and the pulse signal B is used as an ignition signal at the initial stage when the engine is started. As shown in FIG. 2, the output of the pickup coil 17 is applied to the gate of the thyristor 4 through the waveform reforming circuit 18 and a masking circuit 37.

In the circuitry of FIG. 2, the pulse signal A is applied to the base of a transistor 33 of the ignition timing control circuit 25 via an oppositely poled diode 19 and a resistor 20 and capacitor 21 coupled in parallel. On the other hand, the pulse signal B is applied to the collector of a transistor 39 of the masking circuit 37 via a forward poled diode 22 and a resistor 23 and capacitor 24 which are coupled in parallel.

In the ignition timing control circuit 25, the constant voltage VS of the power source circuit 10 is supplied to the base of the transistor 33 through a resistor 34, and its emitter is grounded. The collector of the transistor 33 is coupled to an input terminal S as set signal to an R-S flip-flop circuit 26. The constant voltage VS is applied to the collector of the transistor 35 through a resistor 35.

The output terminal Q of the flip-flop 26 is coupled to an invert input of an operational amplifier 27 through a resistor 30, and a capacitor 29 is coupled across the invert input and an output terminal of the operational amplifier 27.

The output terminal of the operational amplifier 27 is coupled to the invert input of an operational amplifier 28, and the noninvert input of the operational amplifier 28 is coupled to a junction of resistors 31 and 32. The other terminal of the resistor 32 is grounded. The constant voltage VS is supplied to the positive terminal of the operational amplifier 28 through a resistor 31.

The output terminal of the operational amplifier 28 is coupled to a reset input terminal R of the flip-flop 26, and further is coupled to the gate of the thyristor 4 through a capacitor 36.

The ignition timing control circuit 25 is composed of the above-mentioned flip-flop 26, operational amplifiers 27 and 28, a capacitor 29 and resistors 30, 31 and 32, and a pulse forming circuit which is composed of the transistor 33, the resistors 34 and 35.

In the ignition timing control circuit 25, the capacitor 29 is charged or discharged in turn at every input of the negative input signal A from the pickup coil 17, and the control signal is output from the output terminal of the operational amplifier 28 after a lapse of a predetermined time period from input of the signal A in synchronism with rotation of the engine. The delay time of the signal from the negative input signal A is varied by a voltage which is applied to the noninvert input of the operational amplifier 27 from the operational amplifier 46 of a function signal generating circuit 45. The capacitor 36 serves as a differential capacitor for differentiating the output signal of the operational amplifier 28, and the differential output signal is applied to the gate of the above-mentioned thyristor 4.

The masking circuit 37 is to intercept the signal B which is applied to the gate of the thyristor 4 from the pickup coil 17. After start of the engine, the constant voltage VS of the power source circuit 10 is given to a terminal 41a of a timer circuit 38, which is composed of a resistor 41 and a capacitor 42. The capacitor 42 is charged by the constant voltage current. And when a voltage across both the terminals of the capacitor 42 reaches a predetermined value after lapse of a predetermined time period from start of the engine, a transistor 39, which is coupled to the capacitor 42 at the base, turns on. As a result, the positive pulse signal B from the pickup coil 17 is bypassed to the ground through the transistor 39, and is not applied to the gate of the thyristor 4.

In FIG. 1, a throttle sensor 43 is, for instance, a potentiometer which is in operative connection with the throttle valve 44 at a rotating shaft, and the rotating shaft is rotated corresponding to operation of the throttle valve 44. The constant voltage VS is applied to the throttle sensor 43 as shown in FIG. 2, and an output voltage which is substantially proportional to an opening degree of the throttle valve 44 is obtained. The output of the throttle sensor 43 is inputted to a function voltage generator 45. The output of the function voltage generator 45, which is issued from a operational amplifier 46, is applied to the noninvert input of the operational amplifier 27 of the ignition timing control circuit 25; and a timing for generation of a signal of the ignition timing control circuit 25 is varied responding to the opening degree of the throttle valve 44. Thereby the ignition timing is varied.

Referring to FIG. 2, the function voltage generator 45 comprises an inverter composed of an operational amplifier 46 and resistors 47, 48, 49, 50 and 51, and a negative feedback circuit composed of an operational amplifier 52 and resistors 53 and 54 and a diode 55. The resistor 49 is coupled across the output terminal and the invert input of the operational amplifier 46, and the output terminal thereof is coupled to the noninvert input of the operational amplifier 27 of the ignition timing control circuit 25. The noninvert input of the operational amplifier 46 is coupled to a junction of the resistors 47 and 48, whereby the constant voltage VS is divided into a lower constant voltage, and the invert input of the operational amplifier 52 is coupled to a junction of the resistors 53 and 54, whereby the constant voltage VS is also divided into a lower constant voltage. The output voltage of the throttle sensor 43 is inputted to a invert input of the operational amplifier 46 through the resistors 50 and 51, and the higher the output voltage of the throttle sensor 43 becomes, the lower the output voltage of the operational amplifier 46 becomes. On the other hand, an output terminal of the operational amplifier 46 is coupled to a noninvert input of the operational amplifier 52. When the output voltage of the operational amplifier 46 drops under a predetermined value, the output voltage of the operational amplifier 52 turns to a low level, since the output voltage of the operational amplifier 46 is inputted to the noninvert input of the operational amplifier 52. As a result, the output current of the throttle sensor 43 flows into the operational amplifier 52 via the diode 55, and the input voltage of the invert input of the operational amplifier 46 is maintained at a constant value which is decided by a voltage of the invert input of the operational amplifier 52. Therefore, even if the opening degree of the throttle valve is further increased, the output voltage of the operational amplifier 46 is retained at a constant value.

A second masking circuit 56 for a state of closed throttle valve is composed of an operational amplifier 57, resistors 58 and 59 and a diode 60 as shown in FIG. 2. The masking circuit 56 serves to intercept the output of the ignition timing control circuit 25, when the output voltage of the throttle sensor 43 is under a predetermined value, namely the opening degree of the throttle valve is under a predetermined value.

The noninvert input of the operational amplifier 57 is coupled to a junction of the resistors 50 and 51 of the function voltage generator 45, and therefrom the output voltage of the throttle sensor 47 is inputted to the noninvert input of the operational amplifier 57. When an input voltage of the noninvert input of the operational amplifier 57 is under a predetermined value, the output terminal voltage of the operational amplifier 57 becomes a low level, and voltages of the output termineral of the operational amplifier 28 of the ignition timing control circuit 25 and of the reset input terminal R of the flip-flop 26 are lowered through the diode 60. As a result, the output of the ignition timing control circuit 25 is intercepted for the idling state of the engine.

In FIG. 1, a crank angle sensor 61 is arranged in immediate proximity to a ring gear 62 which is mounted on a rotating shaft of the engine (not shown in FIG. 1). When the engine rotates, the crank angle sensor 61 generates pulse signal corresponding to teeth of the ring gear 62. In an actual crank angle sensor 61, a series of the pulse signal is generated when a piston of the engine exists adjacent to the top dead center.

The output of the crank angle sensor 61 is inputted to a pulse counting circuit 63. The pulse counting circuit 63 is composed of a waveform reforming comparator 64, a 4-bit binary counter 66, resistors 67, 68, 69, 70, 71 and 72, a comparator 73 for detecting an output voltage of the binary counter 66, resistors 74, 75 and 76, a flip-flop 77 for setting and resetting the binary counter 66 and a diode 78 which is coupled between the output terminal of the comparator 73 and the gate of the thyristor 4 through a resistor 74. A resistor 65 is inserted between the crank angle sensor 61 and the noninvert input of the comparator 64. The invert input of the comparator 64 is grounded, and the output terminal of the comparator 64 is coupled to a clock input terminal of the binary counter 66.

An output terminal $Q_1$ of the binary counter 66 is grounded through the resistors 67 and 70. The junction of the resistors 67 and 70 is coupled to an output terminal $Q_2$ through the resistors 71 and 68. The junction of the resistors 71 and 68 is coupled to an output terminal $Q_3$ through the resistors 72 and 69. The junction of the resistors 72 and 69 is coupled to an output terminal $Q_4$ through the resistors 86 and 85. The junction of the resistors 86 and 85 is coupled to a noninvert input of the comparator 73. Namely, a D-A converter 63 is composed of the binary counter 66 and these resistors. The output terminal R of the binary counter 66 is coupled to an output terminal Q of the flip-flop 77. The invert input of the comparator 73 is coupled to the junction of the resistor 75 and a variable resistor 76, and the other terminal of the resistor 75 is coupled to the constant voltage VS. The other terminal of the variable resistor 76 is grounded. The output terminal of the comparator 73 is coupled to the gate of the thyristor 4 via the resistor 74 and the diode 78. A set input terminal S of the flip-flop 77 is coupled to the set terminal of the flip-flop 26 of the ignition timing control circuit 25.

The operation of the embodiment is elucidated referring to FIG. 3(a)–FIG. 3(g). The first signal A by the pickup coil 17 as shown in FIG. 3(a) is generated at a timing which is slightly advanced from the optimum ignition timing in high speed revolution range of the engine. The second signal B (FIG. 3(a)) is generated at optimum ignition timing for starting the engine. The second signal B passes the diode 22, and a noise signal included in the second signal B is eliminated by the CR circuit composed of the resistor 23 and capacitor 24. The second signal B is applied to the gate of the thyristor 4 through the masking circuit 37. (Start of engine)

The first signal A passes the diode 19, and a noise signal included in the first signal A is eliminated by the CR circuit which is composed of the resistor 20 and capacitor 21. Then the first signal A is applied to the base of the transistor 33 of the ignition timing control circuit 25.

The transistor 33 is normally ON because of a positive bias voltage which is applied through the resistor 34. When the first signal A is inputted to the base of the transistor 33, the transistor 33 turns OFF during a time period corresponding to the width of the waveform of the first signal A. Accordingly, the constant voltage VS is applied to the set input terminals of the flip-flop 26 and the set input terminal S of the flip-flop 77 of the pulse counting circuit 63 through the resistor 35. Thus, the output terminal Q of the flip-flop 26 turns to low level, and the capacitor 29 is charged to a voltage $A_1$ as shown in FIG. 3(b) and a polarity as shown in FIG. 2.

When the first signal A is inputted to the set input terminal S of the flip-flop 26, the output terminal Q of the flip-flop 26 turns to high level, and the output voltage of the output terminal Q is applied to the invert input of the operational amplifier 27 through the resistor 30. As a result, the output of the operational amplifier 27 turns to low level from high level, and the capacitor 29 which is charged by the polarity as shown in FIG. 2 starts to discharge. Subsequently, the voltage $A_1$ at the output terminal of the operational amplifier 27 gradually lowers as shown in FIG. 3(b).

The output voltage of the operational amplifier 27 is inputted to the invert input of the operational amplifier 28; and when the out voltage reaches to the voltage of the noninvert input of the operational amplifier 28 at a time point t, the output voltage of the operational amplifier 28 turns high revel. The turn of the voltage is transmitted to the gate of the thyristor 4 through the capacitor 36. Furthermore, the high level voltage of the output terminal of the operational amplifier 28 is applied to the reset input terminal R of the flip-flop 26, and the output terminal Q of the flip-flop 26 turns low level to reset.

The voltage of the output terminal Q of the flip-flop 26 is applied to the invert input of the operational amplifier 27, and the output terminal voltage of the operational amplifier 27 turns again high level. Subsequently, the capacitor 29 enters a charging step at the time point t, and the output voltage of the operational amplifier 27 increases with a substantially constant increasing rate. Referring to FIG. 3(b), when the output of the operational amplifier 28 turns high level at the time point t, an ignition signal C is output from the ignition timing control circuit 25. Increase of the output voltage of the operational amplifier 27 continues until coming of the next first signal A which is inputted from the pick up coil 17, and reaches a peak $A_2$ when the next first signal A is inputted. The above-mentioned process is repeated every input of the first signal A.

When the voltage of the noninvert input of the operational amplifier 27 is constant, the gradient of the waveform of the FIG. 3(b) is constant, since the position of the time point t in FIG. 3(b) does not change.

The waveform of the output voltage of the operational amplifier 27 as shown in FIG. 3(b) is changed by variation of the voltage of the noninvert input of the operational amplifier 27. When the voltage of the noninvert input of the operational amplifier 27 is lowered, the discharging time is shortened and the charging time is extended as shown by a solid line in FIG. 3(b). Accordingly, a timing for generation of an ignition signal is shifted to the time point $t_1$.

When the voltage of the noninvert input of the operational amplifier 27 is further lowered, the discharging time is further reduced and the charging time is further extended as shown by a dotted line in FIG. 3(b); and a timing generating a ignition signal is shifted to a time point $t_2$. As mentioned above, generation of the ignition signal depends on the voltage of the noninvert input of the operational amplifier 27, and is not influenced by the revolution speed of the engine.

The input voltage of the noninvert input of the operational amplifier 27 is supplied from the operational amplifier 46 of the function voltage generator 45. The output voltage of the operational amplifier 46 is controlled by the output of the throttle sensor 43, and therefore change of the ignition timing is made correspond to change of the opening degree of the throttle valve 44.

Namely, the output voltage of the throttle sensor 43 increases in proportion to the opening degree of the throttle valve. Therefore, the voltage of the noninvert input of the operational amplifier 27 decreases in proportion to the increase of the opening degree of the throttle valve, and thereby the ignition timing is advanced.

The ignition timing is advanced in proportion to the increase of the opening degree of the throttle valve 44 to a predetermined value, but advance of the ignition timing is restricted in the predetermined value by operation of the negative feedback circuit composed of the operational amplifier 52, a diode 55 and the resistors 53 and 54. In further increase of the opening degree of the predetermined value, the ignition signal is generated at a constant advanced timing from occurrence of the first signal A.

On the other hand, under a low opening degree of the throttle valve in idling, an output voltage of the throttle sensor 43 is lower than the predetermined value, and as mentioned above, the input voltage of the noninvert input of the operational amplifier 57 of the masking circuit 56 is in low level, and the output of the operational amplifier 57 is lowered. Thus, the output voltage of the operational amplifier 28 of the ignition timing control circuit 25 is lowered through the diode 60. Accordingly, the trigger signal C of FIG. 3(d) for the gate of the thyristor 4 is intercepted. Moreover, since the reset signal is not given to the reset terminal R of the flip-flop 26, the capacitor 29 is neither changed nor discharged.

The advance of the ignition timing is fixed at a constant value above a predetermined opening degree of the throttle valve, for example 40%. The predetermined opening degree is adjusted by the respective resistances of the resistors 53 and 54 which are coupled to the invert input of the operational amplifier 52 at the junction. Additionally, an opening degree of the throttle valve in idling, wherein the masking circuit 56 is activated in a small opening degree of the throttle valve, is adjusted by the respective resistances of the resistors 58 and 59 which are coupled to the invert input of the operational amplifier 57 at the junction therebetween.

The output signal of the crank angle sensor 61 for generating a signal corresponding to the teeth of the ring gear 62 is inputted to the noninvert input of the comparator 64 of the pulse counting circuit 63. The output voltae of the comparator 64 turns to high level when the detected signal of the crank angle sensor 61 is applied to the noninvert input of comparator 64, and the high level signal is inputted to a clock input terminal of the 4-bit binary counter 66.

On the other hand, the transistor 33 generates a square wave signal on the collector by reforming the first signal A of the pickup coil 17, and the square wave signal is inputted in the set input terminal S of the flip-flop 77 of the pulse counting circuit 63. As a result, the output terminal Q of the flip-flop 77 turns to low level, and the binary counter 66 is set. Then, the binary counter 66 starts to count the output signal of the crank angle sensor 61, and a stair-shaped signal as shown in FIG. 3(c) is applied to the noninvert input of the comparator 73. When the voltage of the stair-shaped signal reaches a predetermined value, the output voltage of the comparator 73 turns to high level, and an ignition signal D for idling as shown in FIG. 3(d) is generated and is applied to the gate of the thyristor 4 via the resistor 74 and the diode 78. The output voltage is also applied to the resert input terminal R of the flip-flop 77, and the flip-flop 77 is reset. As a result, the output terminal Q of the flip-flop 77 turns to high level, and the binary counter 66 is also reset. Thus, the pulse counting circuit 63 remains still in the above mentioned state until input of the next first signal A. (Idling)

A threshold voltage of the comparator 73 is adjusted by the voltage which is applied to the invert input of the comparator 73, and the voltage is adjusted by the respective resistances of the resistor 75 and the variable resistor 76. In actual case, the voltage is adjusted by handling the variable resistor 76 after mounting of the ignition timing control apparatus is on the engine. Thus, a position of the pulse signal D in FIG. 3(d) is shifted by adjustment of the variable resistor 76, and thereby stability of the revolution speed in idling is easily adjustable.

As mentioned above, the ignition timing in idling depends on number of the pulses detected by the crank angle sensor 61, and hence, the ignition timing is held constant even if the revolution speed of the engine is varied by various factors, such as ununiformity of a density of gaseous fuel. As a result, ignition in idling state is stabilized, and hence the revolution speed in idling can be reduced.

Ignition timing in various operational condition of the engine are shown in FIG. 3(e), FIG. 3(f) and FIG. 3(g).

Figure 4:
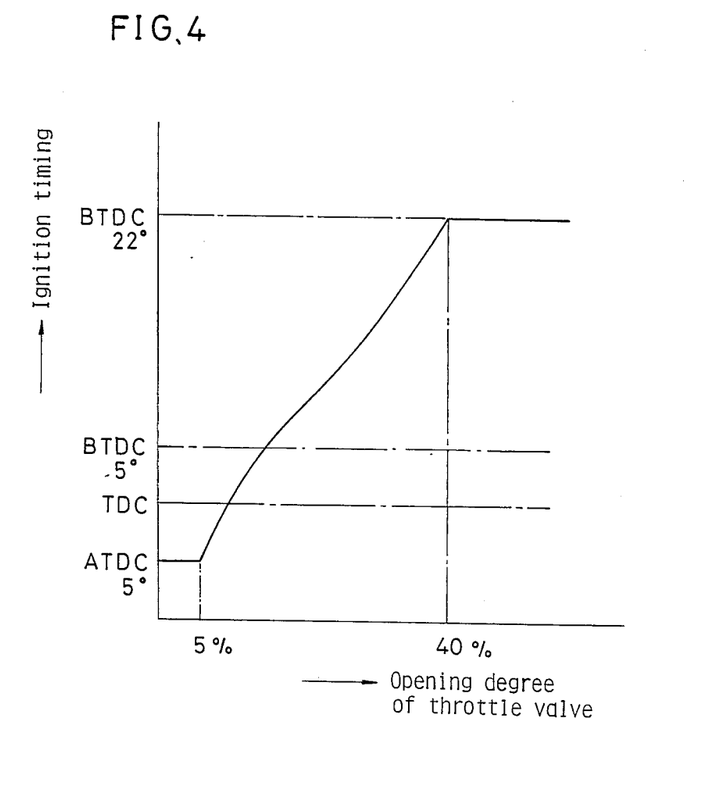
FIG. 4 is a graph showing ignition timing versus opening degree of a throttle valve.

Let us consider an engine wherein the optimum advance angle of the ignition timing is 22° BTDC in high velocity revolution, 5° BTDC in start and 5° ATDC in idling, and that the idling range is under 5% of throttle opening percentage, the timing advances in the range of from 5% to 40% of throttle opening percentage, and the timing is fixed in the range of over 40% of throttle opening percentage as shown in FIG. 4. Further, in the example, the advance angle of the second signal B is set at 5° BTDC as shown in FIG. 3(a), the advance angle of the signal D is set at 5° ATDC as shown in FIG. 3(d), and the advance angle of the signal $C_2$ is set at 22° BTDC.

The engine of the embodiment is for starting by a manual operation, and therefore the power source circuit 10 does not generate an electric power before start of the engine. When the engine is rotated by the manual operation, the second signal B of the output of the pickup coil 17 is applied to the gate of the thyristor 4. Thus, the ignition coil is activated and the engine starts.

After start of the engine, the power source coil 1 generates an alternating current, and the power source 10 supplies a regulated DC current to the respective circuits of the ignition control apparatus. Then, during a predetermined time period from start which is decided by the timer 38, the second signal B, the signal D which is output of the pulse counting circuit 63 and the signal C which is generated at the time point t as shown in FIG. 3(b) are applied to the gate of the thyristor 4. Therefore, three ignition signals are supplied to the gate, but the engine is ignited by the second signal B which is of a first occurrence.

Subsequently, the power source circuit 10 generates the DC voltage, and the capacitor 42 of the timer 38 is charged. When the capacitor is fully charged after a predetermined time period (generally 5-20 seconds), the transistor 39 turns ON and the second signal B from the pickup coil 17 is intercepted of transmission to the gate of the thyristor 4. Thereafter, the engine is ignited by the signal D which is of a second occurrence (idling). Furthermore, since the throttle valve is closed in idling, the masking circuit 56 is activated, and the signal C is intercepted. Thus, only the signal D is transmitted to the gate of the thyristor 4 as shown in FIG. 3(e).

When the throttle valve is opened to accelerate the revolution speed of the engine, the masking circuit 56 turns out of working, and the output signal of the operational amplifier 28 of the ignition timing control circuit 25 is supplied to the gate of the thyristor 4. (That is normal operation of the engine.)

The ignition timing is varied responding to the opening degree of the throttle valve, and a pulse signal $C_1$ in an advanced ignition timing $t_1$, for example, is shown in FIG. 3(f).

When the ignition timing is further advanced by further opening of the throttle valve, the ignition timing is advanced by 22° BTDC, and a pulse signal $C_2$ is generated at a ignition timing $t_2$ as shown in FIG. 3(g).

When the opening degree of the throttle valve exceeds 40% in the embodiment, the advance of the ignition timing is limited by the function voltage generator 45, and the advance angle of the ignition timing is limited to 22° BTDC.

The above-mentioned relation of the ignition timing versus the opening degree of the throttle valve is shown in FIG. 4. The curve as shown in FIG. 4 is an ideal characteristic which is accomplished by the conventional mechanical method. And in the embodiment in accordance with the present invention, the above-mentioned ideal characteristics are obtained by the electronic system. Furthermore, in the embodiment, wear of mechanical elements in the conventional mechanical method and a change of characteristics with the passage of time are eliminated.

Figure 5:
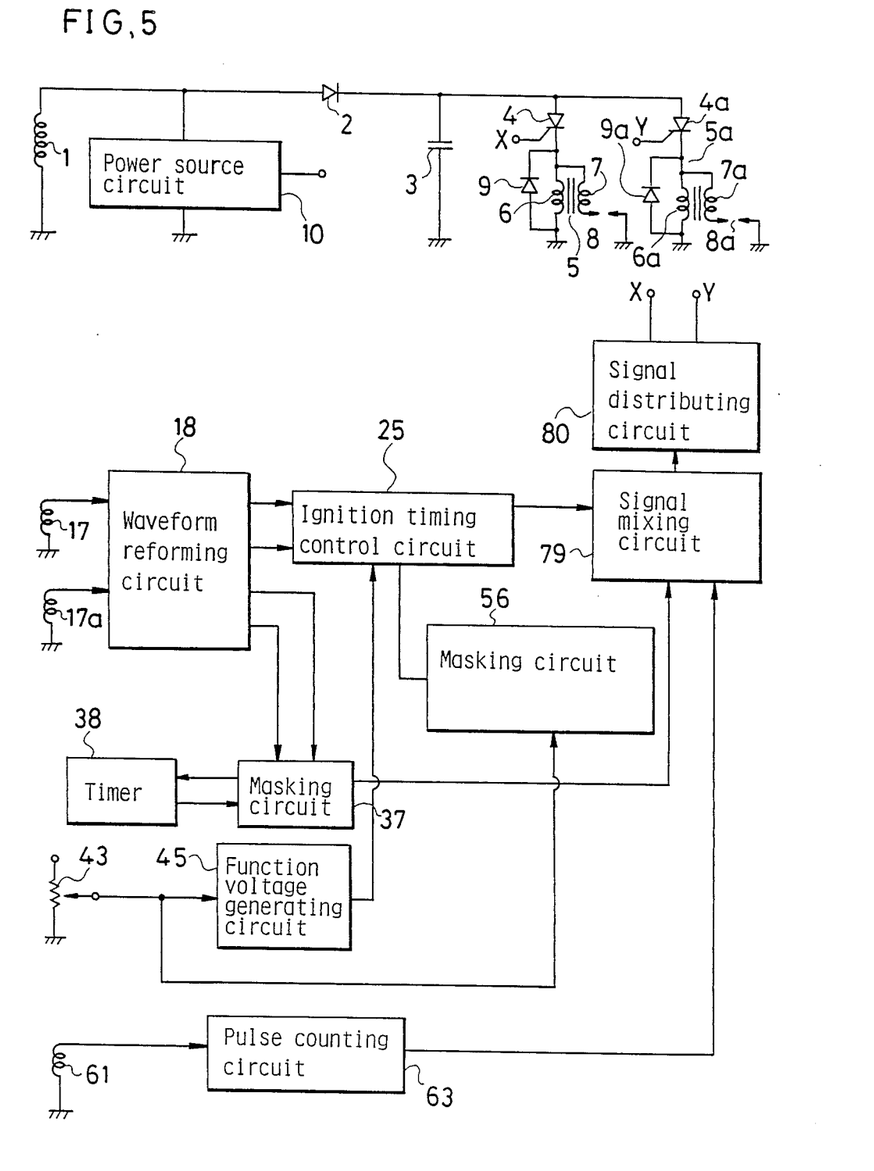
FIG. 5 is a block diagram of a second embodiment of the ignition timing control apparatus in accordance with the present invention.

FIG. 5 is a block diagram of a second embodiment in accordance with the present invention. In the embodiment, the ignition timing control apparatus is applied to a multi-cylinder engine. Referring to FIG. 5, the electric charge which is charged in the capacitor 3 is discharged to the primary coils 6 and 6a of the respective ignition coils 5 and 5a which are provided for two cylinders, for example. Two pickup coils 17 and 17a are mounted on the engine to detect revolution angles of the respective pistons. The outputs of the pickup coils 17 and 17a are inputted to the ignition timing control circuit 25. Then, the ignition signals for the two cylinders are applied to the respective gates of the switching means 4 and 4a through a signal distributing circuit 80. A signal mixing circuit 79 selects one of the ignition signals of start of the engine, idling and a normal operation.

Figure 6:
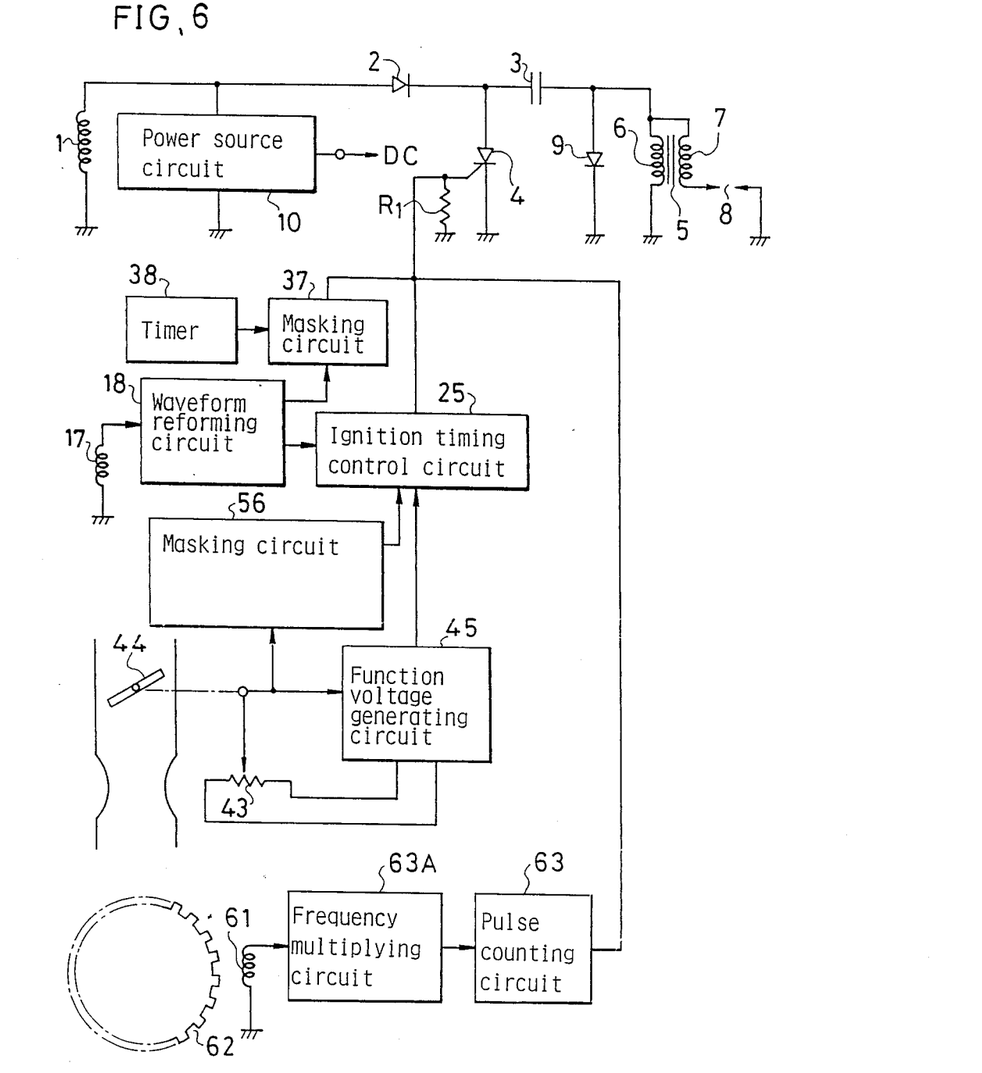
FIG. 6 is a block diagram of a third embodiment of an ignition timing control apparatus in accordance with the present invention.

FIG. 6 is a block diagram of a third embodiment in accordance with a present invention. In the embodiment, the output signal of the crank angle sensor 61 is frequency-multiplied by a frequency-multiplier circuit 63A, and thereby the output frequency of the crank angle sensor is increased. As a result, fine adjustment of the ignition timing in idling state can be realized.

What is claimed is:
1. An ignition timing control apparatus comprising:
a revolution angle sensor for generating a first signal and a second signal which is retarded from said first signal and has optimum ignition timing for starting an engine, a throttle valve opening degree sensor which is in operative connection with a throttle valve of said engine and for generating a valve opening degree signal corresponding to an opening degree of said throttle valve, a function voltage generator for generating an output voltage on the basis of said signal of said throttle valve opening degree sensor, a crank angle sensor for generating a pulse signal corresponding to a revolution angle of said engine, a pulse counting circuit for counting said pulse signal and generating a third signal which is retarded at least from said second signal and is optimum for ignition in idling, an ignition timing control circuit for generating a control signal which is to be retarded from said third signal when the opening degree of said throttle valve is within a first predetermined degree, to be advanced as the opening degree increases in a manner to give an opening suitable for a high speed revolution when the opening degree is above said first opening degree and under a second opening degree of said throttle valve, switching means for giving ignition means an ignition pulse by being actuated by an earliest signal among the control signal from said ignition timing control circuit or the second signal and said third signal received thereby, a timer for detecting lapse of a predetermined time period after start of said engine to issue a time lapse signal, and a masking circuit for intercepting said second signal to be applied to said switching means at reception of said time lapse signal issued by the timer.

2. An ignition timing control apparatus in accordance with claim 1, wherein said output signal of said ignition timing control circuit is intercepted by a second masking circuit which is controlled by the throttle valve opening degree sensor when the opening degree of the throttle valve is smaller than a predetermined value.

3. An ignition timing control apparatus in accordance with claim 1, wherein said function voltage generator comprises an amplifier for amplifying an output of the throttle valve opening degree sensor and an output of said function voltage generator is held at a constant value by a feedback circuit when the opening degree of the throttle valve is above a predetermined value.

4. An ignition timing control apparatus in accordance with claim 1, wherein said first masking circuit intercepts said second signal by detection of a predetermined revolution speed of the engine through a power source coil for generating an electric power at revolution of the engine.

5. An ignition timing control apparatus in accordance with claim 1, wherein said crank angle sensor comprises a frequency multiplier circuit for multiplying output frequency thereof.

6. An ignition timing control apparatus in accordance with claim 1, wherein said pulse counting circuit comprises a D/A converter and a comparator having a first input terminal wherein the output of said D/A converter is inputted and a second input terminal whereto a variable reference voltage for setting number of pulses for generating the third signal is to be applied.

* * * * *